(12) United States Patent
Sippel et al.

(10) Patent No.: US 10,100,660 B2
(45) Date of Patent: Oct. 16, 2018

(54) SEALS FOR GAS TURBINE ENGINES

(71) Applicant: Rolls-Royce Corporation, Indianapolis, IN (US)

(72) Inventors: Aaron D. Sippel, Zionsville, IN (US); Jun Shi, Carmel, IN (US); Emil R. DeJulio, Columbus, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 353 days.

(21) Appl. No.: 14/989,266

(22) Filed: Jan. 6, 2016

(65) Prior Publication Data
US 2016/0222812 A1 Aug. 4, 2016

Related U.S. Application Data

(60) Provisional application No. 62/109,124, filed on Jan. 29, 2015.

(51) Int. Cl.
| | | |
|---|---|---|
| *F01D 11/08* | (2006.01) | |
| *F16J 15/08* | (2006.01) | |
| *F01D 11/12* | (2006.01) | |
| *F01D 11/18* | (2006.01) | |
| *F01D 11/00* | (2006.01) | |

(52) U.S. Cl.
CPC ............ *F01D 11/08* (2013.01); *F01D 11/005* (2013.01); *F01D 11/12* (2013.01); *F01D 11/18* (2013.01); *F16J 15/0887* (2013.01); *F05D 2220/32* (2013.01); *F05D 2230/60* (2013.01); *F05D 2240/11* (2013.01); *F05D 2240/24* (2013.01); *F05D 2240/55* (2013.01); *F05D 2250/75* (2013.01); *F05D 2260/20* (2013.01); *F05D 2300/20* (2013.01); *F05D 2300/50212* (2013.01); *F05D 2300/6033* (2013.01); *Y02T 50/672* (2013.01)

(58) Field of Classification Search
CPC ...... F01D 11/003; F01D 11/005; F01D 11/08; F01D 11/12; F01D 11/18; F16J 15/0887; F05D 2240/11; F05D 2250/75

See application file for complete search history.

(56) References Cited

U.S. PATENT DOCUMENTS

| | | | |
|---|---|---|---|
| 3,601,414 A | 8/1971 | Rao | |
| 3,836,279 A * | 9/1974 | Lee | ........................ F01D 5/3007 415/115 |
| 4,477,086 A | 10/1984 | Feder et al. | |

(Continued)

FOREIGN PATENT DOCUMENTS

| | | |
|---|---|---|
| EP | 0 924 387 A2 | 6/1999 |
| EP | 2 728 125 A1 | 5/2014 |

(Continued)

OTHER PUBLICATIONS

Extended European Search Report, European Application No. 161503262.8 - 1610, dated Jun. 6, 2016, 9 pages.

*Primary Examiner* — Jason Shanske
*Assistant Examiner* — Topaz L Elliott
(74) *Attorney, Agent, or Firm* — Barnes & Thornburg LLP

(57) ABSTRACT

A turbine shroud for use in a gas turbine engine that includes a metallic carrier, a blade track, and a seal is disclosed. The seal is engaged with surfaces of the metallic carrier and the blade track to block ingress of hot gasses at the interface of the blade track and the metallic carrier.

19 Claims, 6 Drawing Sheets

(56) References Cited

U.S. PATENT DOCUMENTS

| | | | |
|---|---|---|---|
| 4,642,024 A * | 2/1987 | Weidner | F01D 11/08 |
| | | | 415/116 |
| 4,759,555 A * | 7/1988 | Halling | F16J 9/18 |
| | | | 277/631 |
| 5,738,490 A * | 4/1998 | Pizzi | F01D 11/005 |
| | | | 415/139 |
| 5,927,942 A * | 7/1999 | Stahl | F01D 11/005 |
| | | | 415/115 |
| 6,237,921 B1 * | 5/2001 | Liotta | F16J 15/0887 |
| | | | 277/630 |
| 6,726,448 B2 | 4/2004 | McGrath et al. | |
| 6,733,233 B2 | 5/2004 | Jasklowski et al. | |
| 7,090,459 B2 | 8/2006 | Bhate et al. | |
| 7,207,771 B2 * | 4/2007 | Synnott | F01D 11/08 |
| | | | 415/173.1 |
| 7,217,089 B2 * | 5/2007 | Durocher | F01D 11/005 |
| | | | 415/170.1 |
| 7,435,049 B2 | 10/2008 | Ghasripoor et al. | |
| 8,047,773 B2 | 11/2011 | Bruce et al. | |
| 8,651,497 B2 * | 2/2014 | Tholen | F01D 11/005 |
| | | | 277/644 |
| 8,790,067 B2 | 7/2014 | McCaffrey et al. | |
| 8,814,173 B2 | 8/2014 | Motzkus et al. | |
| 9,850,773 B2 * | 12/2017 | Zelesky | F01D 11/005 |
| 2011/0057394 A1 | 3/2011 | Halling | |
| 2011/0150635 A1 | 6/2011 | Motzkus et al. | |
| 2013/0192257 A1 * | 8/2013 | Horine | F01D 11/08 |
| | | | 60/796 |
| 2016/0003080 A1 * | 1/2016 | McGarrah | F01D 11/003 |
| | | | 415/173.1 |

FOREIGN PATENT DOCUMENTS

| | | |
|---|---|---|
| EP | 2 775 103 A2 | 9/2014 |
| FR | 2980235 B1 | 4/2015 |
| WO | 00/12920 A1 | 3/2000 |
| WO | 2015002673 A2 | 1/2015 |

\* cited by examiner

SEALS FOR GAS TURBINE ENGINES

CROSS REFERENCE TO RELATED APPLICATIONS

This application claims priority to and the benefit of U.S. Provisional Patent Application No. 62/109,124, filed 29 Jan. 2015, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. Sealing between such components can present design challenges.

SUMMARY

The present disclosure may comprise one or more of the following features and combinations thereof.

A turbine shroud for use in a gas turbine engine that extends around a central axis may include an annular metallic carrier, an annular blade track, and a metallic seal. The annular metallic carrier may be adapted to be coupled to a gas turbine engine case, and the annular metallic carrier may be formed to include a cooling channel that opens inwardly in a radial direction. The annular blade track may be nested in the annular metallic carrier and arranged radially inward of the cooling channel. The metallic seal may be engaged with surfaces of the annular metallic carrier and a radially-outer surface of the annular blade track to block ingress of hot gasses into the cooling channel at the interface of the annular blade track and the annular metallic carrier.

In some embodiments, the annular blade track may comprise a ceramic-containing blade track.

In some embodiments, the seal may include a first split ring having a W-shaped cross section that opens outwardly in the radial direction so that pressurized cooling air provided to the cooling channel encourages the first split ring to change size axially such that the first split ring engages the surfaces of the annular metallic carrier during use of the turbine shroud. The first split ring may include a circumferential break that allows the first split ring to be expanded and contracted. The circumferential break in the first split ring may provide a gap between first and second portions of the first split ring when the first split ring is assembled into the turbine shroud. The seal may include a gap filler that extends across the gap between the first and second portions of the first split ring. Additionally, in some embodiments, first and second portions of the first split ring adjacent to the circumferential break may overlap one another when the first split ring is assembled into the turbine shroud. Further, in some embodiments, the seal may include a second split ring having a W-shaped cross section that opens outwardly in the radial direction so that pressurized cooling air provided to the cooling channel encourages the second split ring to change size axially during use of the turbine shroud. The first split ring and the second split ring may each include a circumferential break that allows the first split ring and the second split ring to be expanded and contracted. The circumferential break of the first split ring may be spaced about 180 degrees from the circumferential break of the second split ring. The second split ring may be nested inside the first split ring so that at least a portion of the second split ring is arranged radially inward of the first split ring. Further still, in some embodiments, about half of the second split ring may be nested inside the first split ring. Further yet still, in some embodiments, substantially all of the second split ring may be nested inside the first split ring. Finally, in some embodiments, the seal may include a plurality of biasing members arranged to bias the first split ring toward engagement with the annular blade track. The biasing members may include a first spring ring that extends around the first split ring and engages a first radially-outwardly opening trough formed by the W-shaped cross section of the first split ring, and a second spring ring that extends around the first split ring and engages a second radially-outwardly opening trough formed by the W-shaped cross section of the first split ring.

According to another aspect of the present disclosure, a turbine shroud for use in a gas turbine engine that extends around a central axis may include a carrier, a blade track, and a seal. The carrier may be adapted to be coupled to a gas turbine engine case, and the carrier may be formed to include a cooling channel that opens inwardly in a radial direction. The blade track may be nested in the carrier and arranged radially inward of the cooling channel. The seal may be engaged with surfaces of the carrier defining the cooling channel and a radially-outer surface of the blade track, and the seal may include a first split ring having a W-shaped cross section that opens outwardly in the radial direction.

In some embodiments, the blade track may comprise a ceramic-containing blade track. Additionally, in some embodiments, the seal may include a second split ring having a W-shaped cross section that opens outwardly in the radial direction, and at least a portion of the second split ring may be nested inside the first split ring. The first split ring and the second split ring may each include a circumferential break that allows the first split ring and the second split ring to be expanded and contracted, and the circumferential break of the first split ring may be spaced about 180 degrees from the circumferential break of the second split ring. Further, in some embodiments, the seal may include a plurality of biasing members arranged to bias the first split ring toward engagement with the annular ceramic-containing blade track. The biasing members may include a first spring ring that extends around the first split ring and engages a first radially-outwardly opening trough formed by the W-shaped cross section of the first split ring, and a second spring ring that extends around the first split ring and engages a second radially-outwardly opening trough formed by the W-shaped cross section of the first split ring.

According to yet another aspect of the present disclosure, a method of assembling a turbine shroud may comprise creating a seal by nesting a first split ring having a W-shaped cross section and a second split ring having a W-shaped cross section so that circumferential breaks in the first and second split rings are offset from one another by 180 degrees, and positioning the seal radially between a carrier and a blade track so that the seal engages surfaces defining a radially-inwardly opening cooling channel formed by the carrier and a radially-outer surface of the blade track.

These and other features of the present disclosure will become more apparent from the following description of the illustrative embodiments.

DETAILED DESCRIPTION OF THE DRAWINGS

Figure 1:
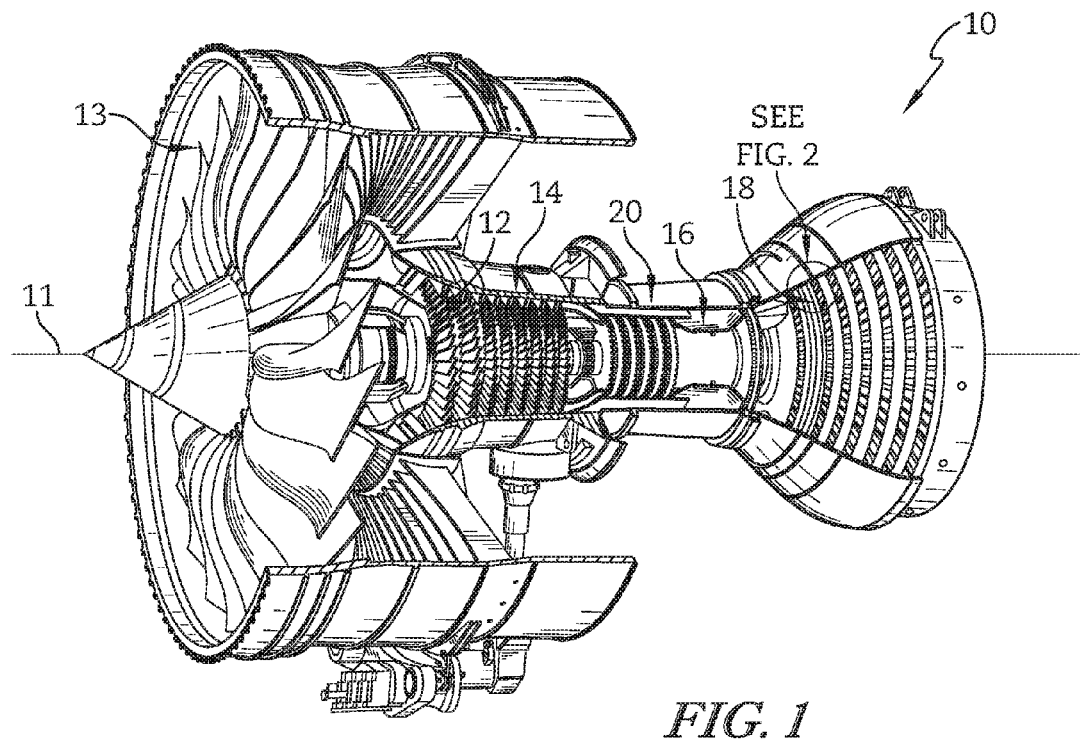
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

Referring now to FIG. 1, an illustrative aerospace gas turbine engine 10 is cut-away to show that the engine 10 includes an output shaft 12, a compressor 14, a combustor 16, and a turbine 18 all mounted to a case 20. The output shaft 12 is configured to be coupled to a fan 13 and is driven by the turbine 18. The compressor 14 compresses and delivers air to the combustor 16. The combustor 16 mixes fuel with the compressed air received from the compressor 14 and ignites the fuel. The hot high pressure products of the combustion reaction in the combustor 16 are directed into the turbine 18 and the turbine 18 extracts work to drive the compressor 14 and the output shaft 12.

Figure 2:
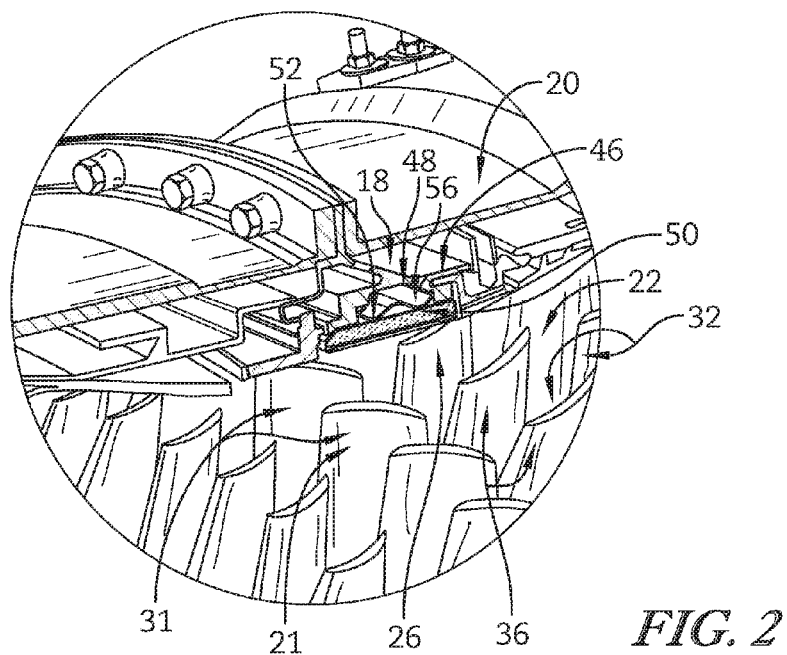
FIG. 2 is a detail view of a turbine shroud adapted for use in a turbine of the gas turbine engine of FIG. 1.

Referring now to FIG. 2, the turbine 18 illustratively includes static turbine vane assemblies 21, 22 and a turbine wheel assembly 26. Each vane assembly 21, 22 includes a plurality of corresponding vanes 31, 32, and the turbine wheel assembly 26 includes a plurality of corresponding blades 36. The vanes 31 of the vane assembly 21 direct the combustion products from the combustor 16 toward the blades 36 of the turbine wheel assembly 26. The blades 36 are in turn pushed by the combustion products to cause the turbine wheel assembly 26 to rotate; thereby, driving the rotating components of the compressor 14 and/or the output shaft 12.

The turbine 18 also includes a turbine shroud 46 that extends around a central axis 11 to block combustion products from passing over the blades 36 without pushing the blades 36 to rotate. The exemplary first stage turbine shroud 46, shown in FIG. 2, extends around the first stage turbine wheel assembly 26 and is sized to block most combustion products from passing over the blades 36 without pushing the blades 36 to rotate. Combustion products that are allowed to pass over the blades 36 do not push the blades 36, and such passed-over products contribute to lost performance within the engine 10.

Figure 3:
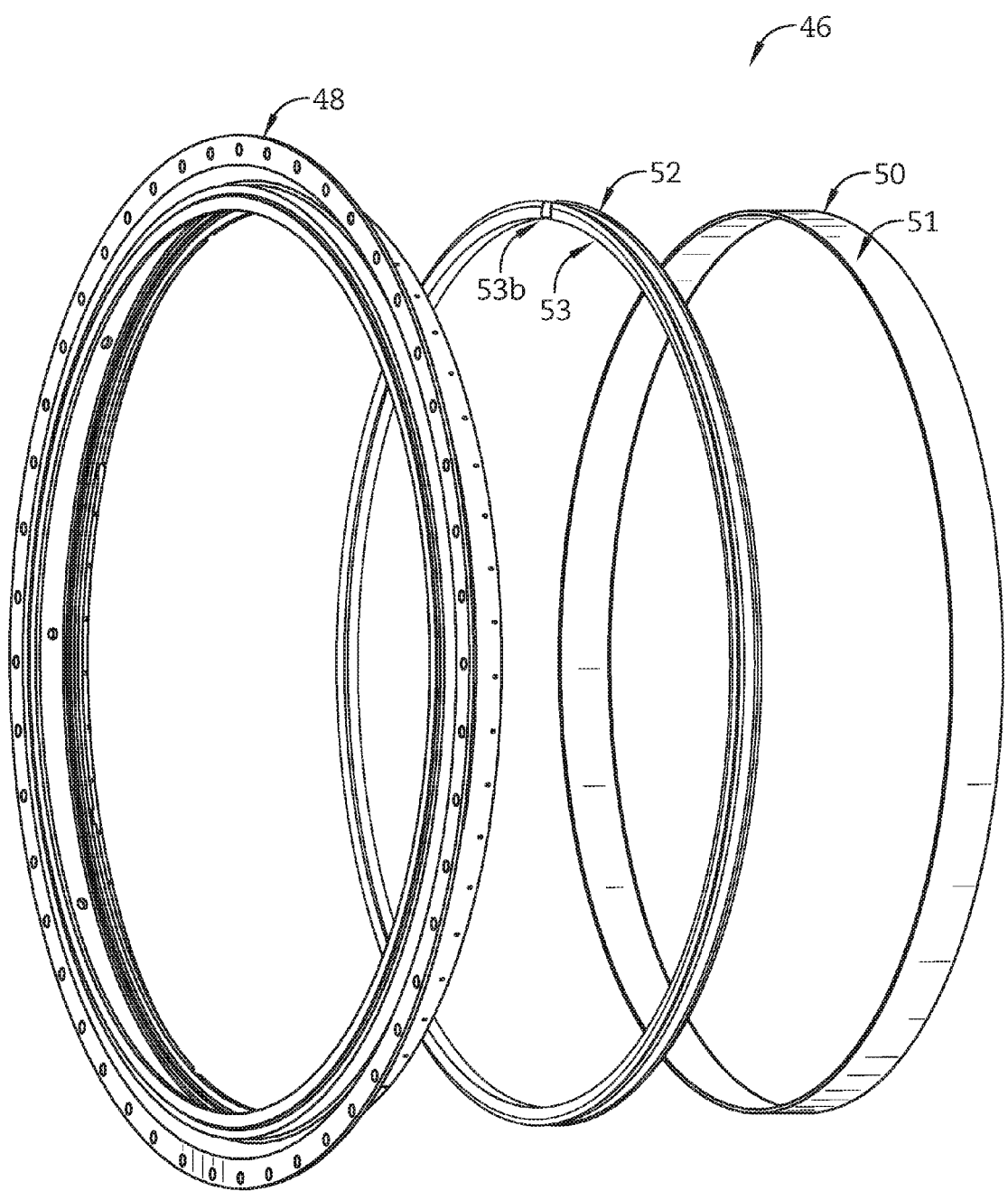
FIG. 3 is an assembly view of the turbine shroud of FIG. 2 showing that the turbine shroud includes an annular carrier, an annular blade track, and a seal.

Referring now to FIGS. 2-3, the turbine shroud 46 illustratively includes a carrier 48, a blade track 50 coupled to the carrier 48, and a seal 52 coupled to the carrier 48 and the blade track 50. The carrier 48 is an annular component that is illustratively made of metallic material and adapted to be coupled to the case 20. The blade track 50 is also an annular component that is illustratively made of a ceramic-containing material and nested in the carrier 48. Further, the seal 52 is an annular component that is illustratively made of metallic material and adapted to be arranged between the carrier 48 and the blade track 50.

The carrier 48 is illustratively formed to include a cooling channel 56 that opens inwardly in a radial direction relative to the central axis 11 as shown in FIG. 2. The blade track 50 is nested in the carrier 48 so that the blade track 50 is arranged radially inward of the cooling channel 56. The seal 52 is engaged with surfaces 64, 65 of the carrier 48 and a surface 60 of the blade track 50 to block ingress of hot gasses into the cooling channel 56 at the interface of the blade track 50 and the carrier 48.

Figure 4:
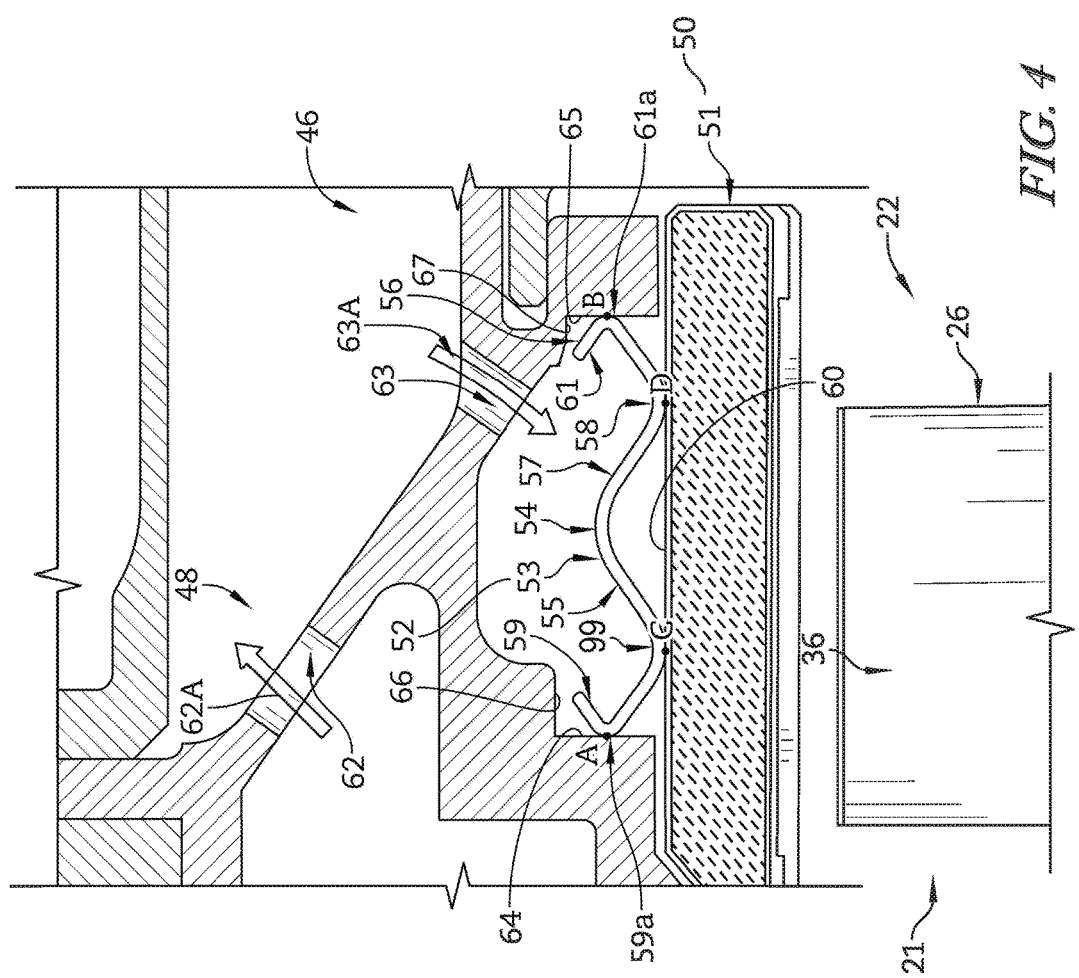
FIG. 4 is a sectional view of the turbine shroud of FIG. 2 showing the seal arranged between the annular carrier and the annular blade track.

Referring now to FIGS. 3 and 4, the carrier 48, the blade track 50, and the seal 52 are shown in greater detail. Each of the carrier 48, the blade track 50, and the seal 52 is illustratively a component of a unitary construction that extends substantially continuously around the central axis 11. As a result, thermal expansion and contraction of each of the carrier 48, the blade track 50, and the seal 52 is substantially radially uniform about the axis 11 during use of the turbine shroud 46. In other embodiments, however, each of the carrier 48, the blade track 50, and/or the seal 52 may be formed from a plurality of joined segments that extend only partway around the central axis 11. In such embodiments, thermal expansion and contraction of the segments of each of the carrier 48, the blade track 50, and the seal 52 may not be substantially radially uniform about the axis 11 during use of the turbine shroud 46.

The coefficient of thermal expansion of the metallic carrier 48 is greater than that of the ceramic-containing blade track 50. The carrier 48 therefore expands and contracts at a different rate than the blade track 50 in response to a change in temperature during operation of the turbine shroud 46. To maintain engagement with the surfaces 64, 65 of the carrier 48 and the surface 60 of the blade track 50, the seal 52 expands and contracts as the carrier 48 and the blade track 50 expand and contract relative to one another. As discussed below, the change in size of the seal 52 as the carrier 48 and the blade track 50 change size enables the seal 52 to block ingress of hot gasses into the channel 56 and facilitate temperature control of the carrier 48.

The carrier 48 is illustratively formed to include, in addition to the cooling channel 56, passages 62, 63 that are fluidly coupled to each other and the cooling channel 56 as best seen in FIG. 4. The passages 62, 63 are adapted to communicate cooling air supplied by a cooling air source (not shown) to the cooling channel 56 as suggested by arrows 62A and 63A. By communicating cooling air through the passages 62, 63 to the channel 56, the temperature of the carrier 48 may be controlled to manage the thermal expansion and contraction of the carrier 48 during use of the shroud 46. Temperature control of the carrier 48 may be used to control clearance between the carrier 48 and the blade track 50, as well as clearance between the blade track 50 and the blades 36 during use of the turbine shroud 46.

The blade track 50 is formed to include an annular runner 51 that has the radially-outward surface 60 as shown in FIGS. 3-4. The annular runner 51 is illustratively made of a ceramic matrix composite (CMC) material. For purposes of this application, a ceramic material is any monolithic ceramic or composite material in which at least one constituent is a ceramic. In one example, the runner 51 may be made from silicon carbide fibers embedded in a silicon carbide matrix, and the runner 51 may include a number of wrapped reinforcement plies. In another example, the runner 51 may include chopped fiber reinforcements, strand reinforcements, or other types of reinforcement. In other embodiments, the runner 51 may be made of other metallic, non-metallic, or composite materials with low coefficients of thermal expansion.

The seal 52 is illustratively formed to include a split ring 53 as shown in FIGS. 3-4. The split ring 53 illustratively has a W-shaped cross section and is formed to include a circumferential break 53b. The circumferential break 53b facilitates assembly of the turbine shroud 46 and allows the first split ring 53 to expand and contract during operation of the turbine shroud 46. In this way, the split ring 53 expands and contracts to maintain engagement of the carrier 48 and the blade track 50 with the seal 52 as indicated above.

The split ring 53 further includes a radially-inwardly opening central peak 54, a radially-outwardly opening trough 56, and a radially-outwardly opening trough 58 as best seen in FIG. 4. The trough 99 is interconnected with one side 55 of the peak 54 and the trough 58 is interconnected with another side 57 of the peak 54 opposite the side 55. The split ring 53 further still includes flanges 59, 61 interconnected with the troughs 56, 58, respectively. The flanges 59, 61 are formed to include corresponding curved portions 59a, 61a.

Referring now to FIG. 4, a sectional view of a portion of the turbine shroud 46 is shown. The seal 52 is assembled into the shroud 46 in the cooling channel 56 between the carrier 48 and the blade track 50. The surfaces 64, 65 of the carrier 48 face each other and extend radially inward away from respective surfaces 66, 67 to define the cooling channel 56. The passage 63 opens radially inward into the cooling channel 56, and the W-shaped cross section of the split ring 53 opens radially outward to the cooling channel 56. Cooling air delivered to the channel 56 in use of the turbine shroud 46 encourages the split ring 53 to change size in the axial direction to maintain engagement between the split ring 53 and the surfaces 64, 65. Additionally, cooling air delivered to the channel 56 in use of the turbine shroud 46 urges the split ring 53 toward engagement with the surface 60 of the blade track 50.

The split ring 53 is assembled into the shroud 46 at the interface of the carrier 48 and the blade track 50 such that the surfaces 64, 65 are engaged with the split ring 53 as shown in FIG. 4. Specifically, the curved portion 59a of the flange 59 is engaged with the surface 64 at a point A, and the curved portion 61a of the flange 61 is engaged with the surface 65 at a point B. At the points A, B, forces are applied by the surfaces 64, 65 to the flanges 59, 61 to bias the flanges 59, 61 toward one another in the axial direction (i.e., the seal 52 is compressed in the axial direction). The points A, B may be referred to herein as primary seal points that block cooling air delivered to the cooling channel 56 from passing radially inward around the split ring 53 and hot gasses from passing radially outward around the split ring 53 into the cooling channel 56.

The split ring 53 is assembled into the shroud 46 at the interface of the carrier 48 and the blade track 50 such that the surface 60 is also engaged with the split ring 53 as shown in FIG. 4. Specifically, the troughs 99, 58 of the split ring 53 are engaged with the surface 60 at points C, D, respectively. At the points C, D, forces are applied by the surface 60 to the troughs 99, 58 to bias the troughs 99, 58 outward in the radial direction. The points C, D may be referred to herein as secondary seal points that block hot gasses from passing outside of the flow path between the split ring 53 and the surface 60 of the blade track 50. In this way, the points C, D block hot gasses from passing beneath the central peak 54 and the troughs 99, 58 during use of the turbine shroud 46.

Due to surface roughness differences between the carrier 48 and the blade track 50, engagement of the split ring 53 with the carrier 48 at the primary seal points A, B may differ from engagement of the split ring 53 with the blade track 50 at the secondary seal points C, D. For example, the surfaces 64, 65 of the carrier 48 may be smoother (i.e., the surfaces may have a smaller surface roughness value $R_a$) than the surface 60 of the blade track 50. As a result, engagement of the surfaces 64, 65 with the split ring 53 at the points A, B may be maintained to a greater extent than engagement of the surface 60 with the split ring 53 at the points C, D during use of the turbine shroud 46. Put another way, the surface roughnesses of the metallic carrier 48 and split ring 53 may provide a degree of control over the primary seal points A, B that may not be provided over the secondary seal points C, D due to the surface roughnesses of the metallic split ring 53 and the CMC blade track 50.

The operation of the seal 52 during use of the turbine shroud 46 will now be described with reference to FIG. 4. During use of the turbine shroud 46, cooling air is delivered through the passages 62, 63 to the cooling channel 56 to manage the thermal expansion and contraction of the carrier 48 relative to the blade track 50. As a result, the cooling channel 56 is pressurized by the cooling air as suggested by FIG. 4. When the cooling channel 56 is pressurized, the split ring 53 is urged radially inward to maintain engagement with the surface 60 against the biasing forces applied to the split ring 53 at the points C, D. Because the split ring 53 is compressed axially, the split ring 53 changes size axially with the carrier 48 and the blade track 50 to maintain engagement with the surfaces 64, 65 against the biasing forces applied to the split ring 53 at the points A, B.

Engagement of the split ring 53 with the surface 60 at the points C, D and engagement of the split ring 53 with the surfaces 64, 65 at the points A, B provides several benefits. For example, that engagement blocks ingress of hot gasses into the channel 56, thereby lessening the extent that those gasses pass between the carrier 48 and the blade track 50 and contribute to lost performance within the engine 10. Additionally, that engagement blocks cooling air delivered to the cooling channel 56 from passing radially inward around the split ring 53 and hot gasses from passing radially outward around the split ring 53, thereby facilitating temperature control of the carrier 48. During use of the shroud 46, the circumferential break 53b of the split ring 53 allows the split ring 53 to change size to maintain engagement with the carrier 48 at points A, B and with the blade track 50 at points C, D. Additionally, the circumferential break 53b of the split ring 53 facilitates the proper positioning of the split ring 53 in the cooling channel 56 prior to use of the turbine shroud 46.

Figure 5:
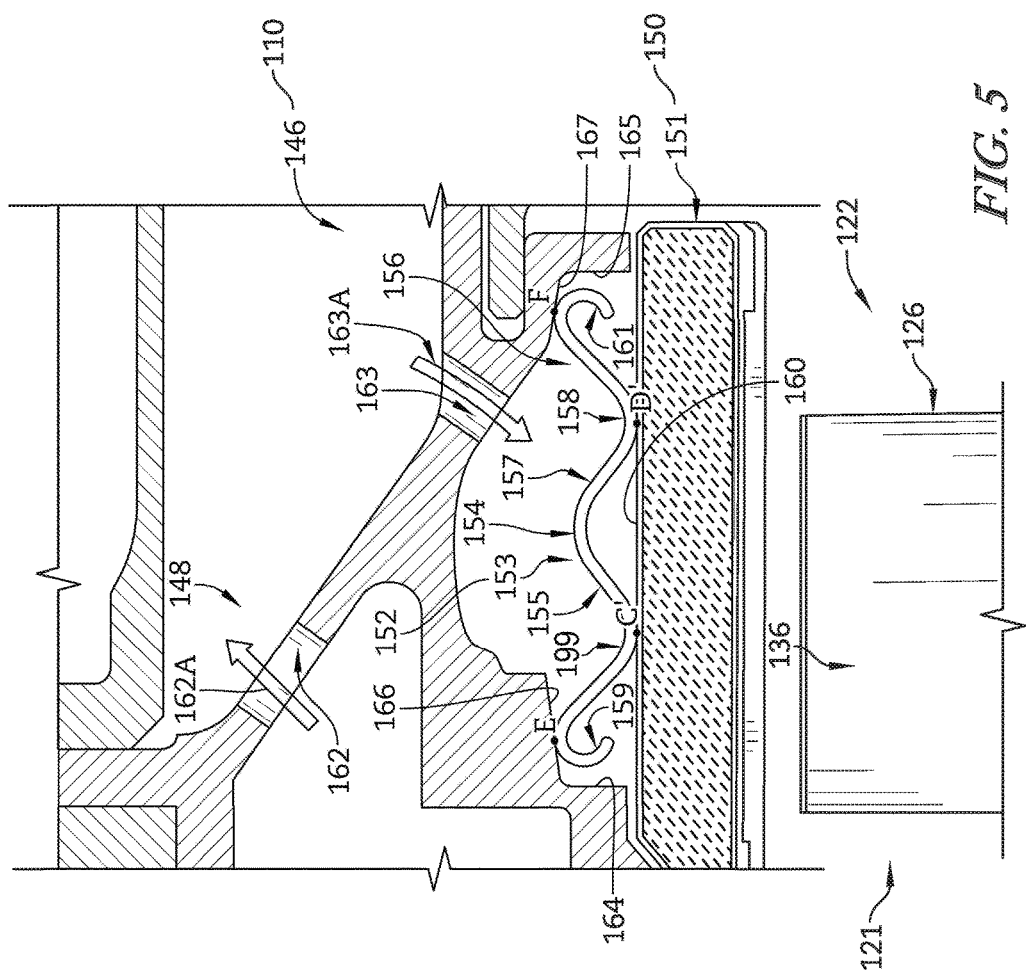
FIG. 5 is a sectional view of another turbine shroud adapted for use in a turbine of a gas turbine engine showing a seal arranged between an annular carrier and an annular blade track.

Referring now to FIG. 5, a sectional view of a portion of a turbine shroud 146 is shown. The turbine shroud 146 is adapted for use in gas turbine engine 110 and is substantially similar to the turbine shroud 46 shown in FIGS. 1-4 and described herein. Like the split ring 53, the split ring 153 is illustratively assembled into the turbine shroud 146 at the interface of the carrier 148 and the blade track 150 such that the troughs 199, 158 of the split ring 153 are engaged with the surface 160 at the points C', D', respectively. The points C', D' may therefore be referred to herein as secondary seal points that block hot gasses from passing outside of the flow path between the split ring 153 and the surface 160 of the blade track 150.

Unlike the split ring 53, the split ring 153 is assembled into the turbine shroud 146 at the interface of the carrier 148 and the blade track 150 such that the split ring 153 engages the surfaces 166, 167 of the carrier 148 as shown in FIG. 5. The surfaces 166, 167 are generally perpendicular to the corresponding surfaces 164, 165 of the carrier 148. Arced flanges 159, 161 of the split ring 153 are illustratively engaged with the surfaces 166, 167 at the points E, F. At the points E, F, forces are applied by the surfaces 166, 167 to bias the split ring 153 radially inward toward engagement with the surface 60 at the secondary seal points C', D'. The split ring 153 is therefore compressed inwardly in the radial direction by the carrier 148. The points E, F may be referred to herein as primary seal points that block cooling air delivered to the cooling channel 156 from passing radially inward around the split ring 153 and hot gasses from passing radially outward around the split ring 153.

Like the carrier 48 and the blade track 50, the surface roughness of the carrier 148 and the blade track 150 may be different from one another. Thus, engagement of the split ring 153 with the carrier 148 at the primary seal points E, F may differ from engagement of the split ring 153 with the blade track 150 at the secondary seal points C', D'. For example, the surfaces 166, 167 of the carrier 148 may be smoother (i.e., the surfaces may have a smaller roughness value $R_a$) than the surface 160 of the blade track 150. As a result, engagement of the surfaces 166, 167 with the split ring 153 at the points E, F may be maintained to a greater extent than engagement of the surface 160 and the split ring 153 at the points C', D' during use of the turbine shroud 146. Put another way, the surface roughnesses of the metallic carrier 148 and split ring 153 may provide a degree of control over the primary seal points E, F that may not be provided over the secondary seal points C', D' due to the surface roughnesses of the metallic split ring 153 and the CMC blade track 150.

The arced flanges 159, 161 of the split ring 153 illustratively have a greater length than the flanges 59, 61 of the split ring 53 as suggested by FIG. 5. Like the seal 52, the seal 152 changes size as the carrier 148 and the blade track 150 change size during use of the turbine shroud 146. The length of the arced flanges 159, 161 permit the flanges 159, 161 to slide axially along the surfaces 166, 167 as the seal 152 expands and contracts with the carrier 148 and the blade track 150 in the radial direction. In this fashion, engagement of the split ring 153 with the carrier 148 at the points E, F and engagement of the split ring 153 with the blade track 150 at the points C', D' is maintained during use of the turbine shroud 146.

The operation of the seal 152 during use of the turbine shroud 146 will now be described with reference to FIG. 5. During use of the turbine shroud 146, cooling air is delivered through the passages 162, 163 to the cooling channel 156 to manage the thermal expansion and contraction of the carrier 148 relative to the blade track 150. As a result, the cooling channel 156 is pressurized by the cooling air as suggested by FIG. 5. Pressurization of the cooling channel 156, coupled with the radially-inwardly biasing forces applied to the split ring 153 at the points E, F, urges the split ring 153 radially inward to maintain engagement with the surface 160 against the radially-outwardly biasing forces applied to the split ring 153 at the points C', D'. When the split ring 153 changes size in the radial direction, the split ring 153 slides axially along the surfaces 166, 167 so that engagement of the split ring 153 with the surfaces 166, 167 at the points E, F is maintained.

Engagement of the split ring 153 with the surface 160 at the points C', D' and engagement of the split ring 153 with the surfaces 166, 167 at the points E, F provides several benefits. For example, that engagement blocks ingress of hot gasses into the channel 156, thereby lessening the extent that those gasses pass between the carrier 148 and the blade track 150 and contribute to lost performance within the engine 110. Additionally, that engagement blocks cooling air delivered to the cooling channel 156 from passing radially inward around the split ring 153 and hot gasses from passing radially outward around the split ring 153, thereby facilitating temperature control of the carrier 148. During use of the turbine shroud 146, the circumferential break (not shown) of the split ring 153 allows the split ring 153 to change size to maintain engagement with the carrier 148 at points E, F and with the blade track 150 at points C', D'. Additionally, the circumferential break of the split ring 153 facilitates the proper positioning of the split ring 153 in the cooling channel 156 prior to use of the turbine shroud 146.

Figure 6:
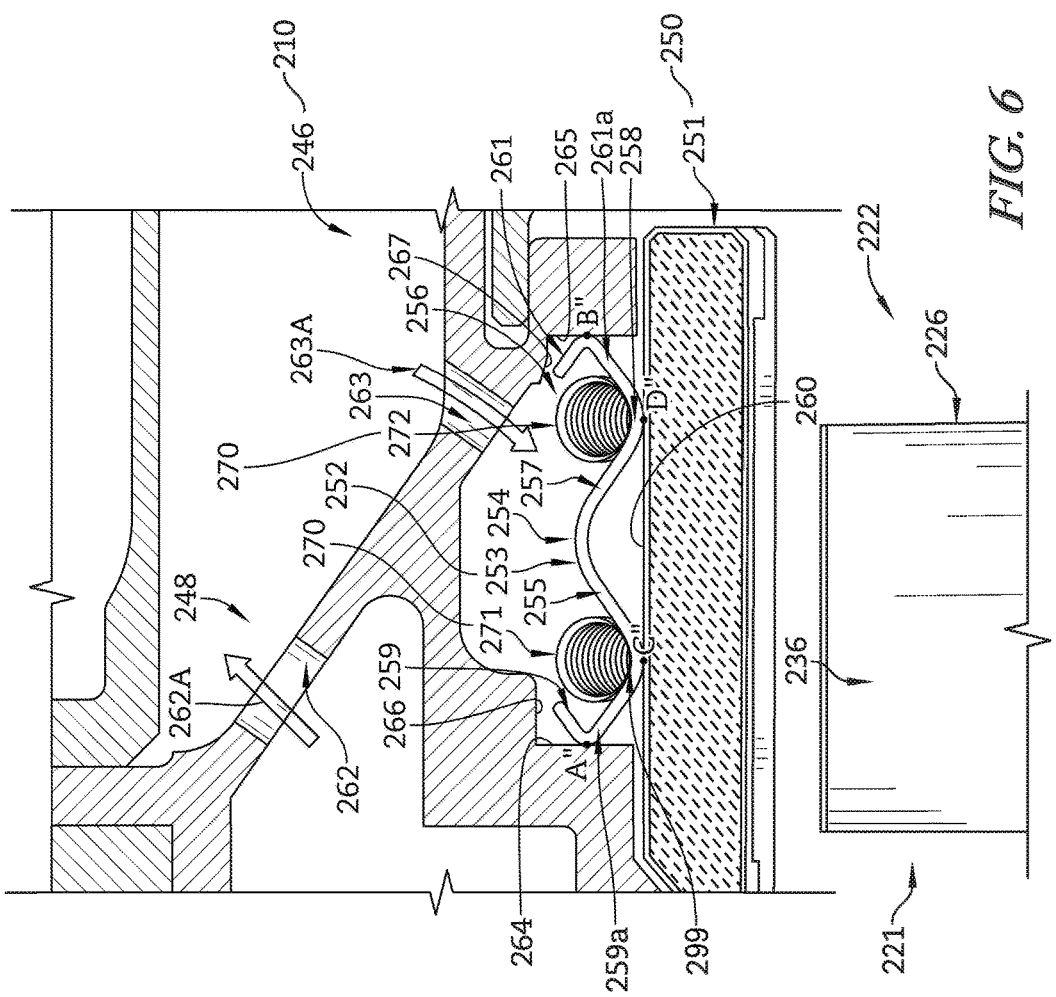
FIG. 6 is a sectional view of yet another turbine shroud adapted for use in a turbine of a gas turbine engine showing a seal including a plurality of biasing members arranged between an annular carrier and an annular blade track.

Referring now to FIG. 6, a sectional view of a portion of a turbine shroud 246 is shown. The turbine shroud 246 is adapted for use in gas turbine engine 210 and is substantially similar to the turbine shroud 46 shown in FIGS. 1-4 and described herein. Like the split ring 53, the split ring 253 is illustratively assembled into the turbine shroud 246 at the interface of the carrier 248 and the blade track 250 such that the flanges 259, 261 of the split ring 253 are engaged with the surfaces 264, 265 at the points A", B". Also like the split ring 53, the split ring 253 is illustratively assembled into the turbine shroud 246 at the interface of the carrier 248 and the blade track 250 such that the troughs 299, 258 of the split ring 253 are engaged with the surface 260 at the points C", D". The points A", B" may be referred to herein as primary seal points that block cooling air delivered to the cooling channel 256 from passing radially inward around the split ring 253 and hot gasses from passing radially outward around the split ring 253. The points C", D" may be referred to herein as secondary seal points that block hot gasses from passing outside of the flow path between the split ring 253 and the surface 260 of the blade track 250.

Unlike the seal 52, the seal 252 illustratively includes a plurality of biasing members 270 arranged to bias the split ring 253 toward engagement with the blade track 250. The plurality of biasing members 270 includes a spring ring 271 that extends around the split ring 253 and engages the trough 299 of the split ring 253. The plurality of biasing members 270 also includes a spring ring 272 that extends around the split ring 253 and engages the trough 258 of the split ring 253. Each of the spring rings 271, 272 receives cooling air delivered to the cooling channel 256 via the passages 262, 263 to maintain the structural integrity of the spring rings 271, 272 during use of the turbine shroud 246. The spring rings 271, 272 may be embodied as coil canted springs such as, for example, coil canted conical springs.

The operation of the seal 252 during use of the turbine shroud 246 will now be described with reference to FIG. 6. During use of the turbine shroud 246, cooling air is delivered through the passages 262, 263 to the cooling channel 256 to manage the thermal expansion and contraction of the carrier 248 relative to the blade track 250. As a result, the cooling channel 256 is pressurized by the cooling air as suggested by FIG. 6. Pressurization of the cooling channel 256, coupled with the radially-inwardly biasing forces applied to the split ring 253 by the spring rings 271, 272, urges the split ring 253 radially inward to maintain engagement with the surface 260 against the radially-outwardly biasing forces applied to the split ring 253 at the points C", D". Because the split ring 253 is compressed axially, the split ring 253 changes size axially with the carrier 248 and the blade track 250 to maintain engagement with the surfaces 264, 265 against the biasing forces applied to the split ring 253 at the points A", B".

Engagement of the split ring 253 with the surface 260 at the points C", D" and engagement of the split ring 253 with the surfaces 264, 265 at the points A", B" provides several benefits. For example, that engagement blocks ingress of hot gasses into the channel 256, thereby lessening the extent that those gasses pass between the carrier 248 and the blade track 250 and contribute to lost performance within the engine 210. Additionally, that engagement blocks cooling air delivered to the cooling channel 256 from passing radially inward around the split ring 253 and hot gasses from passing around the split ring 253, thereby facilitating temperature control of the carrier 248. During use of the turbine shroud 246, the circumferential break (not shown) of the split ring 253 allows the split ring 253 to expand and contract to maintain engagement with the carrier 248 at points A", B" and with the blade track 250 at points C", D".

In addition to the turbine shrouds 46, 146, 246 described herein and shown in FIGS. 1-6, other embodiments of turbine shrouds contemplated by this disclosure may incorporate particular features of each of the turbine shrouds 46, 146, 246. In one such embodiment, a seal may be installed between a carrier and a blade track such that the carrier applies both a radially-inwardly biasing force (i.e., similar to the turbine shroud 146 shown in FIG. 5) and an axially compressive force (i.e., similar to the turbine shroud 46 shown in FIG. 5) to the seal. Additionally, in that embodiment, biasing members (i.e., similar to the spring rings 271, 272 shown in FIG. 6) may apply a radially-inwardly biasing force to the seal to urge the seal toward engagement with the blade track.

Referring now to FIGS. 7-12, exemplary seals 352, 452, 552, 652, 752, and 852 adapted for use in any of the turbine shrouds 46, 146, 246 of the gas turbine engines 10, 110, 210 are shown in detail. Similar to the seals 52, 152, 252, each of the seals 352, 452, 552, 652, 752, 852 is illustratively a metallic component having at least one W-shaped cross section. Unique features of each of the seals 352, 452, 552, 652, 752, 852 are described below in reference to the particular figure in which each of the seals 352, 452, 552, 652, 752, 852 is shown.

Figure 7:
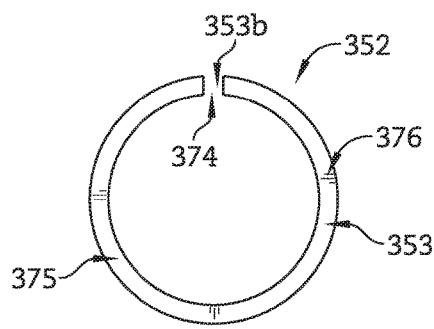
FIGS. 7-12 are front elevation views of various seals included in turbine shrouds adapted for use in the gas turbine engines of FIGS. 1 and 5-6.

Referring now to FIG. 7, the seal 352 is shown in detail. The seal 352 illustratively includes a split ring 353 having a circumferential break 353b. The circumferential break 353b facilitates assembly of the turbine shroud and allows the split ring 353 to expand and contract as other components of the turbine shroud (i.e., the carrier and the blade track) change size during use of the turbine shroud. When the seal 352 is assembled into the turbine shroud, the circumferential break 353b illustratively provides a gap 374 between interconnected portions 375, 376 of the split ring 353 as shown in FIG. 7.

Figure 8:
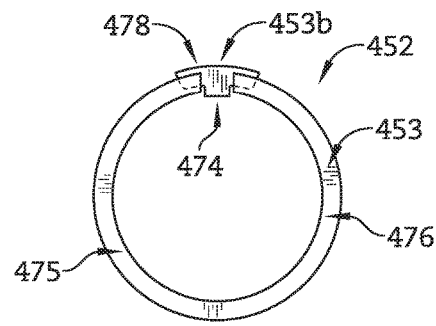

Referring now to FIG. 8, the seal 452 is shown in detail. The seal 452 illustratively includes a split ring 453 having a circumferential break 453b. The circumferential break 453b facilitates assembly of the turbine shroud and allows the split ring 453 to expand and contract as other components of the turbine shroud (i.e., the carrier and the blade track) change size during use of the turbine shroud. When the seal 452 is assembled into the turbine shroud, the circumferential break 453b illustratively provides a gap 474 between interconnected portions 475, 476 of the split ring 453. The seal 452 further includes a gap filler 478 that is received by the portions 475, 476 so that the gap filler 478 extends across the gap 474 as shown in FIG. 8.

Figure 9:
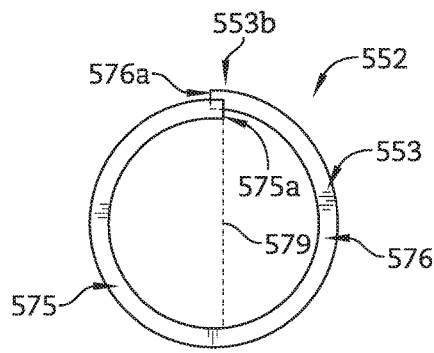

Referring now to FIG. 9, the seal 552 is shown in detail. The seal 552 illustratively includes a split ring 553 having a circumferential break 553b. The circumferential break 553b facilitates assembly of the turbine shroud and allows the split ring 553 to expand and contract as other components of the turbine shroud (i.e., the carrier and the blade track) change size during use of the turbine shroud. When the seal 552 is assembled into the turbine shroud, interconnected portions 575, 576 of the split ring 553 illustratively overlap one another. Specifically, ends 575a, 576a of the respective portions 575, 576 adjacent the break 553b overlap one another. The ends 575a, 576a are illustratively arranged parallel to a vertical axis 579 as shown in FIG. 9.

Figure 10:
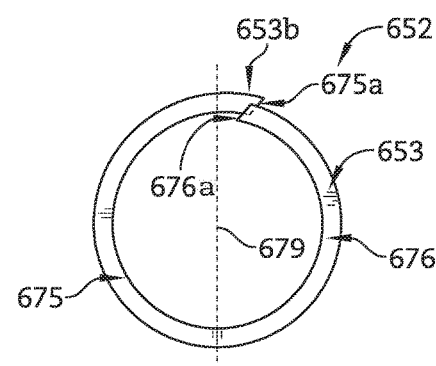

Referring now to FIG. 10, the seal 652 is shown in detail. The seal 652 illustratively includes a split ring 653 having a circumferential break 653b. The circumferential break 653b facilitates assembly of the turbine shroud and allows the split ring 653 to expand and contract as other components of the turbine shroud (i.e., the carrier and the blade track) change size during use of the turbine shroud. When the seal 652 is assembled into the turbine shroud, interconnected portions 675, 676 of the split ring 653 illustratively overlap one another. Specifically, ends 675a, 676a of the respective portions 675, 676 adjacent the break 653b overlap one another. The ends 675a, 676a are illustratively arranged at an angle to a vertical axis 679 as shown in FIG. 10.

Figure 11:
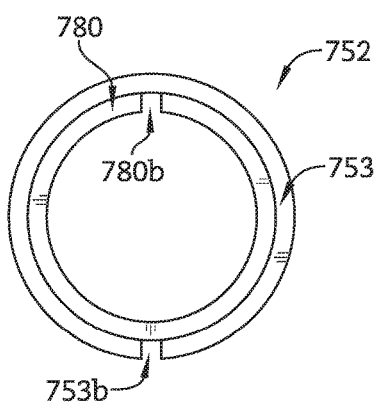

Referring now to FIG. 11, the seal 752 is shown in detail. The seal 752 illustratively includes split rings 753, 780 arranged such that substantially all of the split ring 780 is nested inside of the split ring 753. Substantially all of the split ring 780 is therefore arranged radially inward of the split ring 753. Each of the split rings 753, 780 illustratively has a W-shaped cross section that opens outwardly in the radial direction toward the carrier when the seal 752 is assembled into the turbine shroud. As such, cooling air provided to the split rings 753, 780 during use of the turbine shroud via the cooling channel formed in the carrier encourages the split rings 753, 780 to change size as the carrier and the blade track change size.

The split rings 753, 780 illustratively include circumferential breaks 753b, 780b, respectively, as shown in FIG. 11. The circumferential breaks 753b, 780b facilitate assembly of the turbine shroud and allow the split rings 753, 780 to expand and contract as other components of the turbine shroud (i.e., the carrier and the blade track) change size during use of the turbine shroud. The circumferential break 753b of the split ring 753 is illustratively spaced about 180 degrees from the circumferential break 780b of the split ring 780.

Figure 12:
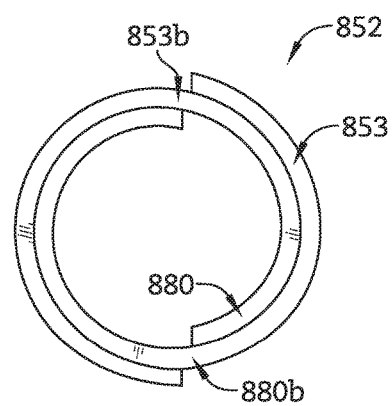

Referring now to FIG. 12, the seal 852 is shown in detail. The seal 852 illustratively includes split rings 853, 880 arranged such that about half of the split ring 880 is nested inside the split ring 853. About half of the sp lit ring 880 is therefore arranged radially inward of the split ring 853. Each of the split rings 853, 880 illustratively has a W-shaped cross section that opens outwardly in the radial direction toward the carrier when the seal 852 is assembled into the turbine shroud. As such, cooling air provided to the split rings 853, 880 during use of the turbine shroud via the cooling channel formed in the carrier encourages the split rings 853, 880 to change size as the carrier and the blade track change size.

The split rings 853, 880 illustratively include circumferential breaks 853b, 880b, respectively, as shown in FIG. 12. The circumferential breaks 853b, 880b facilitate assembly of the turbine shroud and allow the split rings 853, 880 to expand and contract as other components of the turbine shroud (i.e., the carrier and the blade track) change size during use of the turbine shroud. The circumferential break 853b of the split ring 853 is illustratively spaced about 180 degrees from the circumferential break 880b of the split ring 880. The split rings 853, 880 are illustratively arranged such that the split ring 853 is positioned both radially outward and radially inward of the split ring 853 at the break 853b and the split ring 880 is positioned both radially outward and radially inward of the split ring 880 at the break 880b.

Referring now to FIGS. 1-12, a method of assembling a turbine shroud, such as turbine shrouds 46, 146, 246, is contemplated by this disclosure. The method may include creating a seal (e.g., seals 752 or 852) by nesting a first split ring (e.g., split ring 753 or 853) having a W-shaped cross section and a second split ring (e.g., split ring 780 or 880) having a W-shaped cross section so that circumferential breaks (e.g., 753b and 780b, or 853a and 880b) in the first and second split rings are offset from one another by about 180 degrees. The method may further include positioning the seal radially between a carrier (e.g., carrier 48, 148, or 248) and a blade track (e.g., blade track 50, 150, 250) so that the seal engages surfaces (e.g., surfaces 64 and 65, surfaces 166 and 167, or surfaces 164 and 165) of the carrier defining a radially-inwardly opening cooling channel (e.g., channel 56, 156, or 256) and a radially-outer surface (e.g., surface 60, 160, 260) of the blade track.

The present invention may provide a unique sealing solution for sealing between two full hoop, static components that have different coefficient of thermal expansion values that make them shrink/grow radially with respect to one another. The seals provided by this invention may show how to seal the varying gap between the two static components.

The problem that the present invention may address is how to seal a radial gap between two static components where the components are made from materials with different coefficients of thermal expansion (CTE). The gap between the components may therefore change when the surrounding environment gets hotter or colder. When the components are heated, the inner, low CTE component may grow more slowly than the outer, high CTE component. As such, the gap between the components may be smallest when the components are cold, and the gap may grow as the environment gets hotter. Cooling air supplied through the outer diameter of the outer component may escape through the gap between the inner component and the outer component.

In other situations, the gap between the inner component and the outer component may provide both an inlet for air to enter the gap and an outlet for the air to exit the gap. One such situation may be where the inner component is a blade track that is controlling the tip clearance to a turbine rotor blade. In the event that cooling air supplied through the outer diameter of the outer component does not provide a positive pressure margin, air may enter and exit the gap and avoid passing through the blades attached to the turbine rotor. In this circumstance, work may not be extracted by the turbine.

One embodiment of the present invention may be an axial contact W seal (e.g., the seal 52) shown, for example, in FIG. 4. The W seal may provide a number of flow restrictions. The contact points (i.e., points A and B shown in FIG. 4) may be highlighted as the primary seal points. This may be beneficial because, especially with a full hoop ceramic matrix composite (CMC) blade track (e.g., the blade track 50), the primary air system seal may be moved away from the composite surface which may be less smooth. The surface of the outer component (e.g., the carrier 48) may be machined to produce smooth surfaces (e.g., surfaces with $R_a$<60 microinch). The higher pressure air on the outer side of the W seal may help to keep the W seal down against the inner blade track. The contact between the W seal and the inner component (e.g., at the points C and D shown in FIG. 4) may create the secondary flow restriction which may prevent the gas path air from traveling over the outer diameter of the blade track.

Another embodiment of the present invention may be a radial contact W seal (e.g., the seal 152) shown, for example, in FIG. 5. The contact points (i.e., the points E and F shown in FIG. 5) at the outward side at either end of the W seal may be the primary seal points. This may be beneficial because, especially with a full hoop ceramic matrix composite (CMC) blade track (e.g., the blade track 150), the primary air system seal may be moved away from the composite surface which may be less smooth. The surface of the outer component (e.g., the carrier 148) may be machined to produce smooth surfaces (e.g., surfaces with $R_a$<60 microinch). The higher pressure air on the outer side of the W seal may help to keep the W seal down against the inner blade track. The contact between the W seal and the inner component (e.g., at the points C' and D shown in FIG. 5) may create the secondary flow restriction which may prevent the gas path air from avoiding the blade tips (e.g., the blades 36) and traveling over the outer diameter of the blade track. The added benefit of the radial contact W-seal is may be that there is mechanical interference (i.e., at the points E and F) that forces the W seal down into the low CTE CMC blade track. A drawback of this configuration may be that the backside cooling air pressure may force the W seal open such that it would no longer be a sufficient flow restrictor.

Yet another embodiment of the present invention may include an additional feature to help hold the W seal (e.g., the seal 252) against the low CTE CMC blade track (e.g., the blade track 250). As shown, for example, in FIG. 6, two canted coil springs (e.g., spring rings 271, 272) may be placed in the valleys (e.g., the troughs 299, 258) of the W seal. These springs may be shielded from the high temperature of the CMC blade track and bathed in cooling air. As such, it may be reasonably expected that those springs can be held at a temperature where they will not yield.

Yet another embodiment still of the present invention may be a combination of the previous embodiments. The legs of the W seal may be made such that the pressure may want to bend the W seal into the outer component. In other words, one leg of the W seal may have a radial contact with the outer metallic component and the opposite leg may have an axial contact with the outer component. The canted coil springs may be used in this embodiment to assist in the secondary sealing function.

In summary, the following advantages may be provided by the present invention: 1) the W seal may provide a primary sealing contact between two metal structures; 2) the metal components may be made to a low surface roughness better than the surface roughness of the as-formed CMC component; 3) the need to machine the CMC component to smooth it may be eliminated; 4) the present invention may create a secondary seal against the W seal and the CMC blade track; 5) the single circumferential split may allow the seal to conform to the outer component and the CMC component throughout many changes in the environment, as well as allowing for simple manufacturing methods; 6) ends of the W seal may be designed such that existing pressure forces may push the seal against the mating component; and 7) the present invention may incorporate a spring to hold the W seal against the inner, low CTE CMC component which may be bathed in the cooling air to keep it at a temperature where it will not yield.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud for use in a gas turbine engine that extends around a central axis, the turbine shroud comprising
    an annular metallic carrier adapted to be coupled to a gas turbine engine case and formed to include a cooling channel that opens inwardly in a radial direction,
    an annular blade track nested in the annular metallic carrier and arranged radially inward of the cooling channel, and
    a metallic seal engaged with surfaces of the annular metallic carrier and a radially-outer surface of the annular blade track to block ingress of hot gases into the cooling channel at the interface of the annular blade track and the annular metallic carrier,
    wherein the seal includes a first split ring having a W-shaped cross section that opens outwardly in the radial direction so that pressurized cooling air provided to the cooling channel encourages the first split ring to change size axially such that the first split ring engages the surfaces of the annular metallic carrier during use of the turbine shroud.

2. The turbine shroud of claim 1, wherein the annular blade track comprises a ceramic-containing blade track.

3. The turbine shroud of claim 1, wherein the first split ring includes a circumferential break that allows the first split ring to be expanded and contracted.

4. The turbine shroud of claim 3, wherein the circumferential break in the first split ring provides a gap between first and second portions of the first split ring when the first split ring is assembled into the turbine shroud, and wherein the seal includes a gap filler that extends across the gap between the first and second portions of the first split ring.

5. The turbine shroud of claim 3, wherein first and second portions of the first split ring adjacent to the circumferential break overlap one another when the first split ring is assembled into the turbine shroud.

6. The turbine shroud of claim 1, wherein the seal includes a second split ring having a W-shaped cross section that opens outwardly in the radial direction so that pressurized cooling air provided to the cooling channel encourages the second split ring to change size axially during use of the turbine shroud.

7. The turbine shroud of claim 6, wherein the first split ring and the second split ring each include a circumferential break that allows the first split ring and the second split ring to be expanded and contracted.

8. The turbine shroud of claim 7, wherein the circumferential break of the first split ring is spaced about 180 degrees from the circumferential break of the second split ring.

9. The turbine shroud of claim 8, wherein the second split ring is nested inside the first split ring so that at least a portion of the second split ring is arranged radially inward of the first split ring.

10. The turbine shroud of claim 8, wherein about half of the second split ring is nested inside the first split ring.

11. The turbine shroud of claim 8, wherein substantially all of the second split ring is nested inside the first split ring.

12. The turbine shroud of claim 1, wherein the seal includes a plurality of biasing members arranged to bias the first split ring toward engagement with the annular blade track.

13. The turbine shroud of claim 12, wherein the biasing members include a first spring ring that extends around the first split ring and engages a first radially-outwardly opening trough formed by the W-shaped cross section of the first split ring and a second spring ring that extends around the first split ring and engages a second radially-outwardly opening trough formed by the W-shaped cross section of the first split ring.

14. A turbine shroud for use in a gas turbine engine that extends around a central axis, the turbine shroud comprising
    a carrier adapted to be coupled to a gas turbine engine case and formed to include a cooling channel that opens inwardly in a radial direction,
    a blade track nested in the carrier and arranged radially inward of the cooling channel, and
    a seal engaged with surfaces of the carrier defining the cooling channel and a radially-outer surface of the blade track, the seal including a first split ring having a W-shaped cross section that opens outwardly in the radial direction.

15. The turbine shroud of claim 14, wherein the blade track comprises a ceramic-containing blade track.

16. The turbine shroud of claim 14, wherein the seal includes a second split ring having a W-shaped cross section that opens outwardly in the radial direction and at least a portion of the second split ring is nested inside the first split ring.

17. The turbine shroud of claim 16, wherein the first split ring and the second split ring each include a circumferential break that allows the first split ring and the second split ring to be expanded and contracted and the circumferential break of the first split ring is spaced about 180 degrees from the circumferential break of the second split ring.

18. The turbine shroud of claim 14, wherein the seal includes a plurality of biasing members arranged to bias the first split ring toward engagement with the annular ceramic-containing blade track.

19. A method of assembling a turbine shroud comprising
creating a seal by nesting a first split ring having a W-shaped cross section and a second split ring having a W-shaped cross section so that circumferential breaks in the first and the second split rings are offset from one another by about 180 degrees, and
positioning the seal radially between a carrier and a blade track so that the seal engages surfaces defining a radially-inwardly opening cooling channel formed by the carrier and a radially-outer surface of the blade track.

* * * * *